US009143715B2

(12) United States Patent
Riddell et al.

(10) Patent No.: US 9,143,715 B2
(45) Date of Patent: Sep. 22, 2015

(54) REMOTE CONTROL WITH CAPACITIVE TOUCHPAD

(71) Applicant: Intel Corporation, Santa Clara, CA (US)

(72) Inventors: Daniel E. Riddell, Oakland, CA (US); Guido Rosso, Palo Alto, CA (US); Fabian Birgfeld, London (GB); Michael Albers, London (GB)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/830,304

(22) Filed: Mar. 14, 2013

(65) Prior Publication Data

US 2014/0267932 A1 Sep. 18, 2014

(51) Int. Cl.
G08C 19/16 (2006.01)
H04N 5/44 (2011.01)
G06F 3/044 (2006.01)
H04N 21/422 (2011.01)
G06F 3/0482 (2013.01)
G06F 3/0485 (2013.01)
G06F 3/0488 (2013.01)
G06F 3/0354 (2013.01)

(52) U.S. Cl.
CPC .......... *H04N 5/4403* (2013.01); *G06F 3/03547* (2013.01); *G06F 3/044* (2013.01); *G06F 3/0482* (2013.01); *G06F 3/0485* (2013.01); *G06F 3/04883* (2013.01); *H04N 21/42202* (2013.01); *H04N 21/42222* (2013.01); *H04N 21/42224* (2013.01); *H04N 2005/443* (2013.01); *H04N 2005/4428* (2013.01)

(58) Field of Classification Search
CPC .................................................... H04N 5/4403
USPC .......... 340/12.54, 12.22, 4.11, 4.12; 345/173; 348/734
See application file for complete search history.

(56) References Cited

U.S. PATENT DOCUMENTS 7,966,568 B2 * 6/2011 Kim ............................... 715/764
8,307,302 B2 * 11/2012 Takaki ........................... 715/810
8,456,284 B2 * 6/2013 Rigazio et al. .............. 340/12.5

(Continued)

FOREIGN PATENT DOCUMENTS

| KR | 1020080016283 A | 2/2008 |
|---|---|---|
| KR | 100980741 B1 | 9/2010 |
| KR | 1020110107477 A | 10/2011 |

OTHER PUBLICATIONS

International Search Report in related PCT matter PCT/US2013/076732, mailed Mar. 27, 2014.

*Primary Examiner* — Toan N Pham
(74) *Attorney, Agent, or Firm* — Schwabe, Williamson & Wyatt, P.C.

(57) ABSTRACT

In embodiments, apparatuses, methods and storage media are described that are associated with menu interfaces for media source and content navigation. In embodiments, an apparatus to control a remote computing device may include a wireless transmitter; a capacitive touchpad; and logic operably coupled with the wireless transmitter and capacitive touchpad. In various embodiments, the logic may be configured to: detect a change in position and/or a velocity of a change in position of a tactile input received at the capacitive touchpad. In various embodiments, the logic may be configured to generate, based at least in part on the detected change in position and/or velocity of the change in position, a signal configured to cause the remote computing device to perform an operation associated with provision of a media content for consumption. In various embodiments, the logic may be configured to transmit the signal with the wireless transmitter directly to a wireless receiver of the remote computing device.

21 Claims, 10 Drawing Sheets

(56) References Cited

U.S. PATENT DOCUMENTS 8,780,279 B2 * 7/2014 Chang et al. .................. 348/734
2007/0229465 A1 * 10/2007 Sakai et al. .................... 345/173
2012/0032901 A1 * 2/2012 Kwon ............................ 345/173
2012/0293449 A1 11/2012 Dietz

* cited by examiner

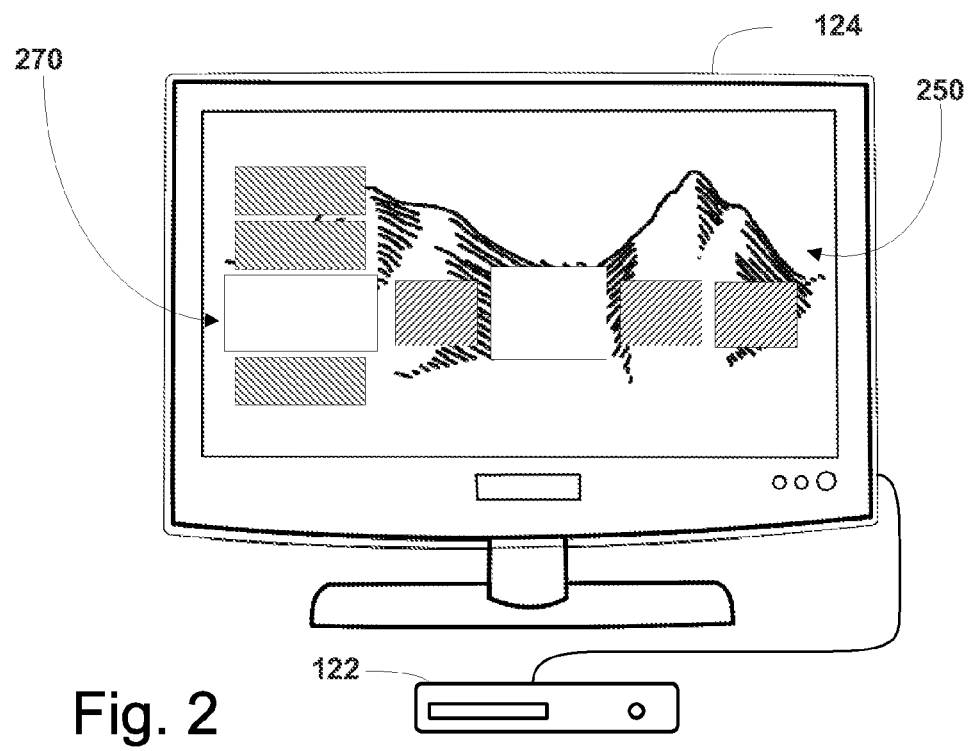
Fig. 2
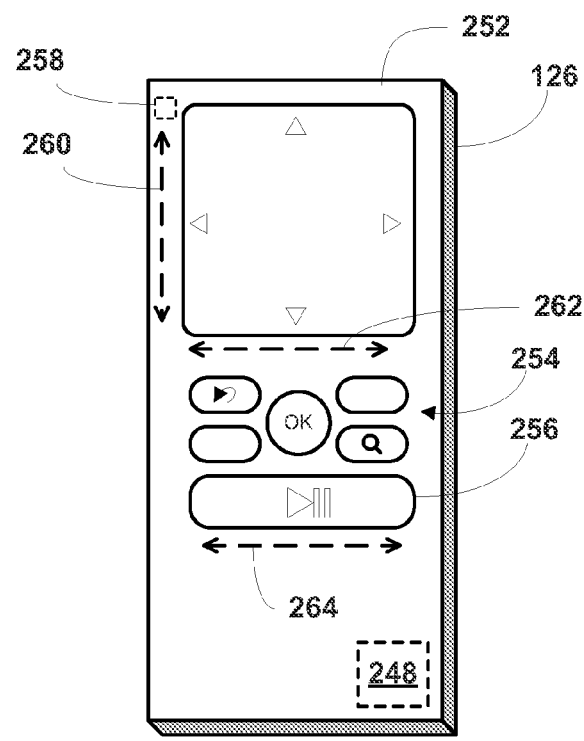

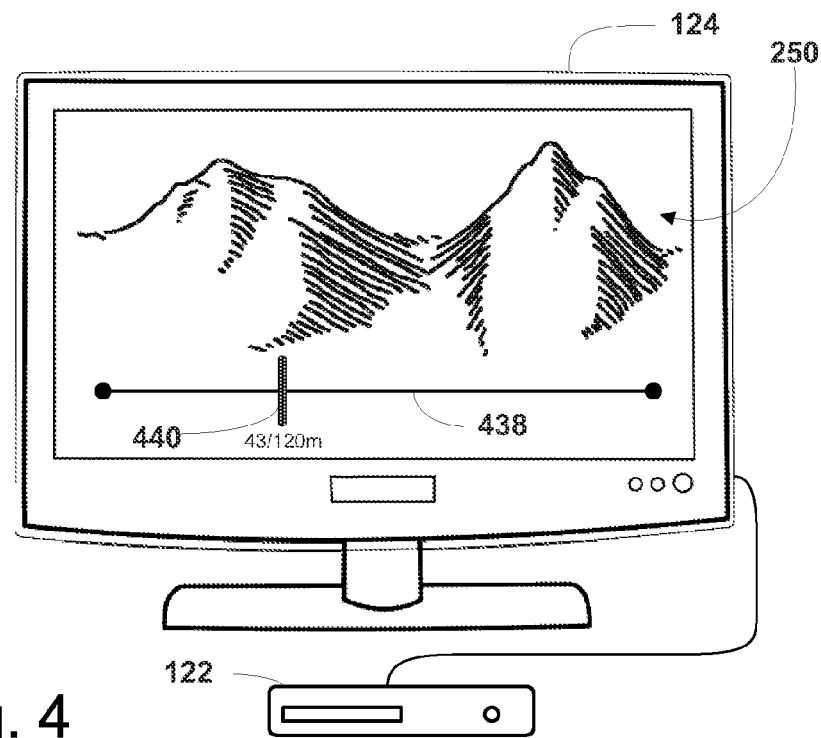
Fig. 4
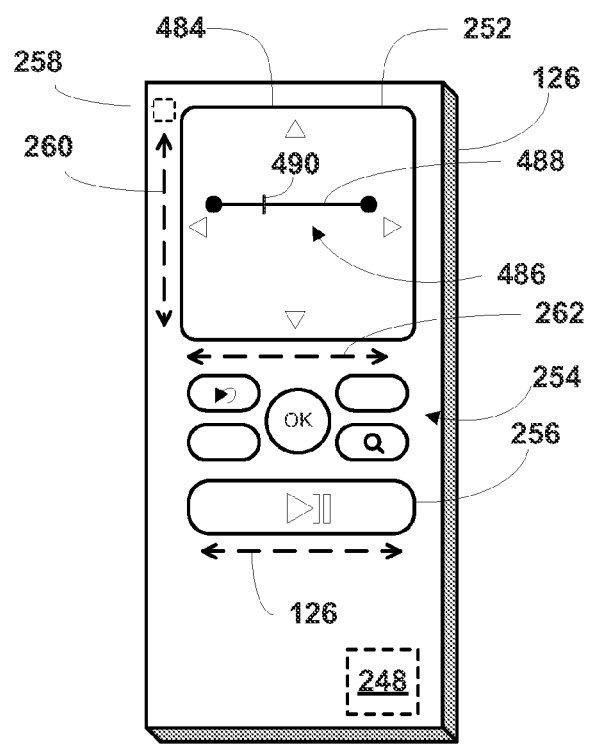

REMOTE CONTROL WITH CAPACITIVE TOUCHPAD

TECHNICAL FIELD

The present disclosure relates to the field of data processing, in particular, to apparatuses, methods and storage media associated with remote controls with capacitive touchpads.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of media content, and the manners in which the content is consumed. Today, myriad media content may be made available from various sources of media content, including but not limited to fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. In some cases, navigating through large numbers of media content and/or through heterogeneous sources of media content with existing remote controls may be cumbersome.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 2 illustrates an example remote control, configured with selected aspects of the present disclosure, being used to navigate through a menu interface, in accordance with various embodiments.

FIG. 4 illustrates an example remote control, configured with selected aspects of the present disclosure, being used to advance or retreat through media content, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
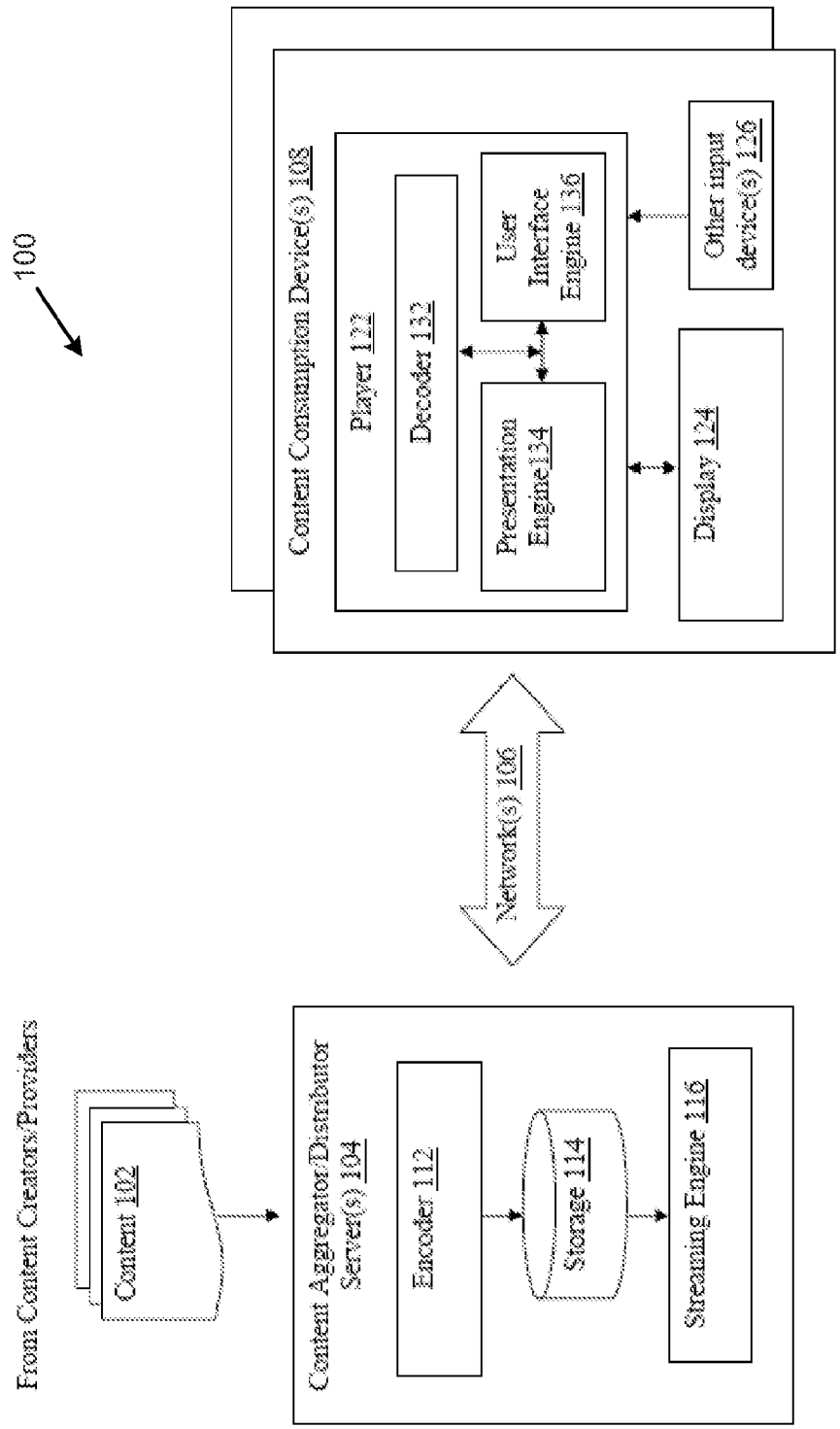
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, via one or more networks 106.

In embodiments, as shown, content aggregator/distributor servers 104 may include encoder 112, storage 114 and content provisioning 116 (referred to as "streaming engine" in FIG. 1), which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. Networks 106 may be any combinations of private and/or public, wired and/or wireless, local and/or wide area networks. Private networks may include, e.g., but are not limited to, enterprise networks. Public networks, may include, e.g., but is not limited to, the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a menu interface as described herein.

While shown as part of a content consumption device 108, display 124 and/or user input device(s) 126 may be stand-alone devices or integrated, for different embodiments of content consumption devices 108. For example, and as depicted in FIGS. 2-7, for a television arrangement, display 124 may be a stand-alone television set, Liquid Crystal Display (LCD), Plasma and the like, while player 122 may be part of a separate set-top set, and user input device 126 may be a separate remote control, gaming controller, keyboard, or another similar device. Similarly, for a desktop computer arrangement, player 122, display 124 and user input device(s) 126 may all be separate stand-alone units. On the other hand, for a mobile arrangement, such as a tablet computing device, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for other mobile devices such as a smartphone arrangement, player 122, display 124 and user input device(s) 126 may be likewise integrated.

Referring now to FIG. 2, a player 122 in the form of a set-top box, or "console." (configured with applicable portions of the present disclosure) may be operably coupled to a display 124, shown here in the form of a flat panel television. In FIG. 2, presentation engine 134 and/or user interface engine 136 of player 122 may render media content 250 on display 124. In various embodiments, media content 250 may be provided to player 122 by content aggregator/distributor server 104. In various embodiments, media content 250 may come from one or more media content sources, such as the one or more providers of content 102 in FIG. 1.

A user input device 126 in the form of a remote control (configured with applicable portions of the present disclosure) may be configured for communication with player 122. In various embodiments, user input device 126 may include internal logic 248 (any combination of hardware and/or software), as well as a first capacitive touchpad 252, one or more other controls 254, and a second capacitive touchpad 256 coupled with logic 248. In various embodiments, one or more other controls 254 may include one or more buttons, knobs, wheels, or other user-operable components. Although the one or more controls 254 are shown positioned between first capacitive touchpad 252 and second capacitive touchpad 256, the illustrated arrangement is not meant to be limiting, and one or more other controls 254 may be positioned elsewhere on user input device 126. Additionally or alternatively, one or more other controls 254 in some embodiments may be omitted.

In various embodiments, user input device 126 may include a wireless transmitter 258 coupled with logic 248 and configured to transmit signals directly, without going through any intermediate wireless signaling device, to a wireless receiver (not shown) of a remote computing device, such as player 122. In various embodiments, wireless transmitter 258 may further include a wireless receiver (not shown) to form a wireless transceiver. In such embodiments, user input device 126 may be configured to receive wireless signals from remote computing devices such as player 122. A variety of wireless technologies may be used to exchange signals between user input device 126 and player 122, including but not limited to infrared, WiFi (e.g., WiFi Direct), BlueTooth, other radio-based wireless technologies, optical-based wireless technologies, and so forth.

In various embodiments, first capacitive touchpad 252 may be configured to receive tactile input along two or more axes, e.g., in the form of a user swiping a finger along an axis. For example, in FIG. 2, first capacitive touchpad 252 may receive tactile input along a first axis 260 and a second axis 262. In FIG. 2, second axis 262 may be oriented perpendicular to first axis 260 but may have other orientations with respect to first axis 260. In various embodiments, second capacitive touchpad 256 may be configured to receive tactile input along a third axis 264. In FIG. 2, third axis 264 is parallel to second axis 262, but in various embodiments, third axis 264 may have other orientations with respect to second axis 262 and/or first axis 260.

In various embodiments, user input device 126 may be configured to detect a change in position (e.g., a magnitude of a swipe) and/or a velocity of a change in position (e.g., a speed of a swipe) of a tactile input received at first capacitive touchpad 252 and/or second capacitive touchpad 256. In various embodiments, based at least in part on the received tactile input, logic 248 of user input device 126 may generate and transmit to player 122 a signal configured to cause player 122 to perform an operation associated with provision of media content 250 for consumption.

For instance, in various embodiments, the signal transmitted from user input device 126 to player 122 may be configured to cause player 122 to scroll through selectable elements of a menu interface 270 rendered by player 122 in association with media content 250. In various embodiments, player 122 may scroll through selectable elements of menu interface 270 by an amount that is based at least in part on to a detected change in position and/or velocity of the change in position of tactile input received at first capacitive touchpad 252. Thus, if a user wishes to scroll through a large number of selectable elements, the user may employ a fast swipe and/or a "long" swipe (e.g., from one extreme side of first capacitive touchpad 252 to another). Likewise, if a user wishes to scroll through a small number of selectable elements, the user may employ a slower or "shorter" swipe.

Figure 3:
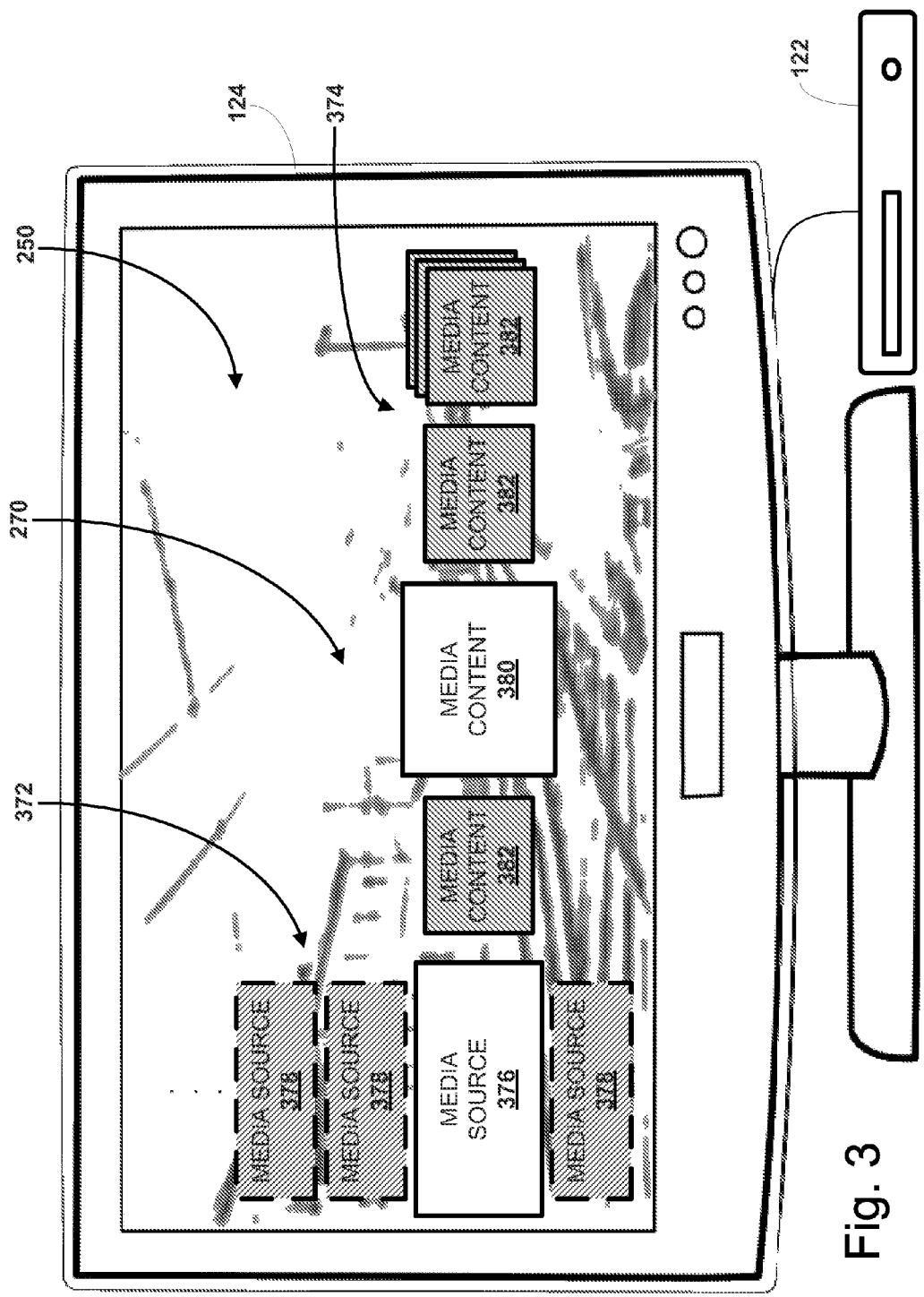
FIG. 3 depicts an example menu interface including arrangements of selectable elements, which may be navigated using a remote control configured with selected aspects of the present disclosure, in accordance with various embodiments.

FIG. 3 depicts an example menu interface 270 that includes a first scrollable arrangement of selectable elements 372 arranged along a generally vertical axis and a second scrollable arrangement of selectable elements 374 arranged along a generally horizontal axis. In various embodiments, these vertical and horizontal axes may correspond to first axis 260 and second axis 262 of first capacitive touchpad 252.

In various embodiments, each of first scrollable arrangement of selectable elements 372 may represent a source of media content. A user may scroll through first scrollable arrangement of selectable elements 372, which in this example would mean scrolling through media content sources (e.g., channel surfing), by swiping his or her finger along an axis of first capacitive touchpad 252, such as first axis 260. The scrolling may change which selectable element is an active media source selectable element 376, which may represent a currently-selected element, and which elements are inactive media source selectable elements 378. In various embodiments, the number of media source selectable elements scrolled through as a result of a swipe or a press-and-drag may be proportional to a magnitude (e.g., change in position from start to finish) and/or a velocity of the swipe or press-and-drag.

In various embodiments, each of second scrollable arrangement of selectable elements 374 may represent media content available from a selected one (e.g., 376) of the first scrollable arrangement of selectable elements. Similar to first scrollable arrangement of selectable elements 372, scrolling second scrollable arrangement of selectable elements 374 may change which selectable element is an active media content selectable element 380, which may represent a currently-selected media content element, and which media content elements are inactive media content selectable elements 382. In various embodiments, the number of media content selectable elements scrolled through as a result of a swipe or press-and-drag may be proportional to a magnitude (e.g., change in position from start to finish) and/or a velocity of the swipe or press-and-drag.

In various embodiments, first capacitive touchpad 252 (and/or second capacitive touchpad 256) may be configured to receive input other than tactile input. For example, first capacitive touchpad 252 may be mechanically or otherwise configured to be pressed by a user. In various embodiments, first capacitive touchpad 252 may be configured to be displaced through a pressing action by a user: in other embodiments, first capacitive touchpad 252 may be configured to be pressed without displacement. In various embodiments, the user pressing first capacitive touchpad 252 may cause logic 248 to generate and transmit to player 122 a signal configured to cause player 122 to navigate through arrangements of selectable elements one-at-a-time. This may be in contrast to swiping, which may cause logic 248 to generate and transmit to player 122 a signal configured to cause player 122 to navigate through multiple selectable elements at a time, depending on the magnitude and/or velocity of the swipe.

For example, pressing any of the directional arrows shown near the four sides of first capacitive touchpad 252 may cause player 122 to perform a corresponding navigational operation. For instance, pressing up or down may cause player 122 to advance or retreat through first scrollable arrangement of selectable elements 372 to navigate through media content sources (much like flipping through channels). Pressing left or right may cause player 122 to advance or retreat through second scrollable arrangement of selectable elements 374, effectively flipping through pieces of media content.

In another aspect, in various embodiments, the signal generated by logic 248 of user input device 126 and transmitted to player 122 may be configured to cause player 122 to advance or retreat through media content 250 by an amount that corresponds to a detected change in position and/or velocity of the change in position of tactile input received at first capacitive touchpad 252 and/or second capacitive touchpad 256. An example of this is depicted in FIG. 4, which is similar to FIG. 2, and in which second capacitive touchpad 256 and/or third axis 264 may be aligned to comport with a typical understanding of media content progression, e.g., left to right.

In various embodiments, including the one shown in FIG. 4, a media content progress path 438 may be rendered, e.g., by player 122, on display 124. In various embodiments, player 122 may be configured to advance a media content indicator 440 along media content progress path 438 by an amount or to a position that corresponds to an amount of progress made through media content 250.

In various embodiments, a user may swipe and/or press and drag her finger from left to right on second capacitive touchpad 256 to advance (e.g., fast forward, ultra fast forward, fast forward at variable speeds, and/or forward frame-by-frame) through media content 250, and from right to left on second capacitive touchpad 256 to retreat (e.g., rewind, ultra rewind, rewind at variable speeds, an/or rewind frame-by-frame) through media content 250. In some embodiments, a rapid swipe of second capacitive touchpad 256 along third axis 264 may advance/retreat media content 250 further and/or more quickly than a press and drag, which may be slower but more precise. In some embodiments, the farther towards either side of second capacitive touchpad 256 the user drags her finger after pressing, the more rapidly media content 250 may be advanced/retreated. In some embodiments, the farther towards either side of second capacitive touchpad 256 the user drags her finger after pressing, the further media content 250 may be advanced/retreated. In some embodiments, the user may tap her finger on an edge of second capacitive touchpad 256 to advance or retreat some predetermined amount (e.g., 30 seconds, one episode, etc.) through media content 250 and/or pieces of media content.

Similar to first capacitive touchpad 252, in various embodiments, second capacitive touchpad 256 may be configured to receive input other than tactile input. For example, second capacitive touchpad 256 may be mechanically or otherwise configured to be pressed by a user. In various embodiments, the user pressing second capacitive touchpad 256 may cause logic 248 to generate and transmit to player 122 a signal configured to cause player 122 to transition between a paused state in which media content 250 is not advanced and an active state in which media content 250 is played. In various embodiments, after swiping her finger across second capacitive touchpad 256, once media content 250 is advanced or retreated in proportion to the magnitude/velocity of the swipe, player 122 may remain in the same state (e.g., paused or active) as it was before the swipe.

In various embodiments, a sequence of pieces of media content, such as episodes of a television show, may be represented by selectable elements of menu interface 270. In various embodiments, the signal generated by logic 248 of user input device 126 and transmitted to player 122 may be configured to cause player 122 to advance or retreat media content 250 between pieces of media content (e.g., advance/retreat across episodes) based on the detected change in position and/or velocity of the change in position of tactile input received at first capacitive touchpad 252 and/or second capacitive touchpad 256, without the user having to press a "skip" or other similar button.

In another aspect, in FIG. 4 user input device 126 may include a remote control display 484 (e.g., liquid crystal display, or "LCD", light-emitting diode, or "LED", organic light-emitting diode, or "OLED", and/or other displays). In various embodiments, remote control display 484 and first capacitive touchpad 252 may together form a touch screen, although in other embodiments they may be separate. In various embodiments, user input device 126 (e.g., via logic 248) may be configured to cause remote control display 484 to render selectable content 486. In FIG. 4, for instance, selectable content 486 includes a remote control progress path 488 and remote control indicator 490. While remote control progress path 488 in FIG. 4 is straight and aligned with second axis 262, remote control progress path 488 may be aligned with any axis and/or may form other non-linear paths, including any shape or a circuitous path.

In various embodiments, logic 248 may be configured to cause remote control display 484 to render remote control indicator 490 at a position along remote control progress path 488 dictated by tactile input received at first capacitive touchpad 252. In various embodiments, logic 248 of user input device 126 may be configured to generate and transmit to player 122 a signal configured to cause player 122 to advance or retreat through media content 250 based on a position and/or change of position of remote control indicator 490 along remote control progress path 488. For instance, player 122 may advance or retreat through media content 250 to a temporal position that corresponds to a position of remote control indicator 490 along remote control progress path 488. Thus, a user may press and drag remote control indicator 490 one way or the other to advance or retreat through media content 250.

In various embodiments, logic 248 of user input device 126 may be configured to generate and transmit to player 122 a signal configured to cause player 122 to advance media content indicator 440 along media content progress path 438 by an amount or to a position that corresponds to a position (or change thereof) of remote control indicator 490 along remote control progress path 488. In some embodiments, other indications of progress through media content 250, such as the time elapsed/time left (in minutes) indication of FIG. 4, may be rendered on display 124 by player 122 and/or on remote control display 484 by logic 248.

In addition to or instead of advancing or retreating media content 250, remote control indicator 490 and remote control progress path 488 may be used for other purposes as well. For example, in some embodiments, logic 248 of user input device 126 may generate and transmit to player 122 a signal configured to cause player 122 to scroll through an arrangement of selectable elements (e.g., 372, 374), e.g., to a position in the arrangement that corresponds to a position of remote control indicator 490 along the remote control progress path 488.

Figure 5:
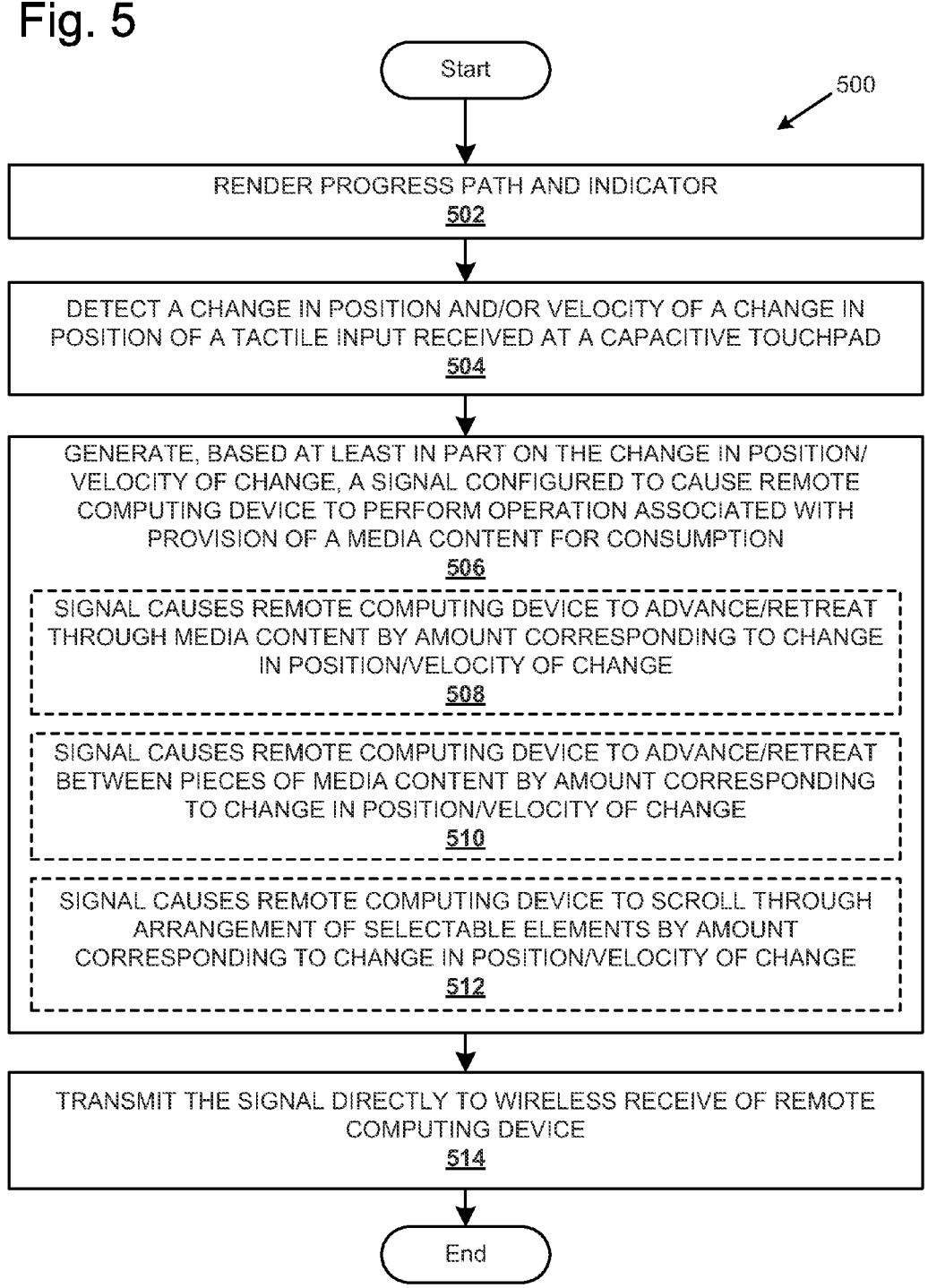
FIG. 5 depicts an example process that may be implemented on various computing devices described herein, in accordance with various embodiments.

FIG. 5 depicts an example process 500 that may be implemented by logic 248 of user input device 126, in accordance with various embodiments. At operation 502, remote control progress path 488 and indicator 490 may be rendered, e.g., by logic 248, on display 484 of user input device 126. In embodiments where user input device 126 does not have a display, operation 502 may be omitted.

At operation 504, a change in position and/or velocity of a change in position of a tactile input received at first capacitive touchpad 252 or second capacitive touchpad 256 may be detected, e.g., by logic 248. At operation 506, a signal configured to cause a remote computing such as player 122 to perform an operation association with provision of media content 250 for consumption may be generated, e.g., by logic 248, based at least in part on the change in position and/or velocity of the change in position.

For example, at operation 508, a signal may be generated, e.g., by logic 248, to cause player 122 to advance/retreat through media content 250 by an amount that corresponds to the detected change in position or velocity of the change in position. This may enable a user to, for instance, "fast forward" and "rewind" through media content 250.

As another example, at operation 510, a signal may be generated, e.g., by logic 248, to cause player 122 to advance/retreat through pieces of media content 250 by an amount that corresponds to the detected change in position or velocity of the change in position. This may enable a user to, for instance, skip between episodes of a television show.

As another example, at operation 512, a signal may be generated, e.g., by logic 248, to cause player 122 to scroll through an arrangement of selectable elements, such as first scrollable arrangement of selectable elements 372 and/or second scrollable arrangement of selectable elements 374, by an amount that corresponds to the detected change in position or velocity of the change in position. This may enable a user to, for instance, navigate through media content sources or pieces of media content more quickly and/or precisely than would be possible using buttons alone.

Whatever signal may be generated at operation 506, at operation 514, the signal may be transmitted, e.g. by logic 248 using wireless transmitter 258, to a wireless receiver of player 122. As noted above, the signal may be transmitted using a variety of wireless technologies, including but not limited to infrared, BlueTooth, WiFi (e.g., WiFi Direct), optical-based technologies, other radio-based technologies, and so forth.

Figure 6:
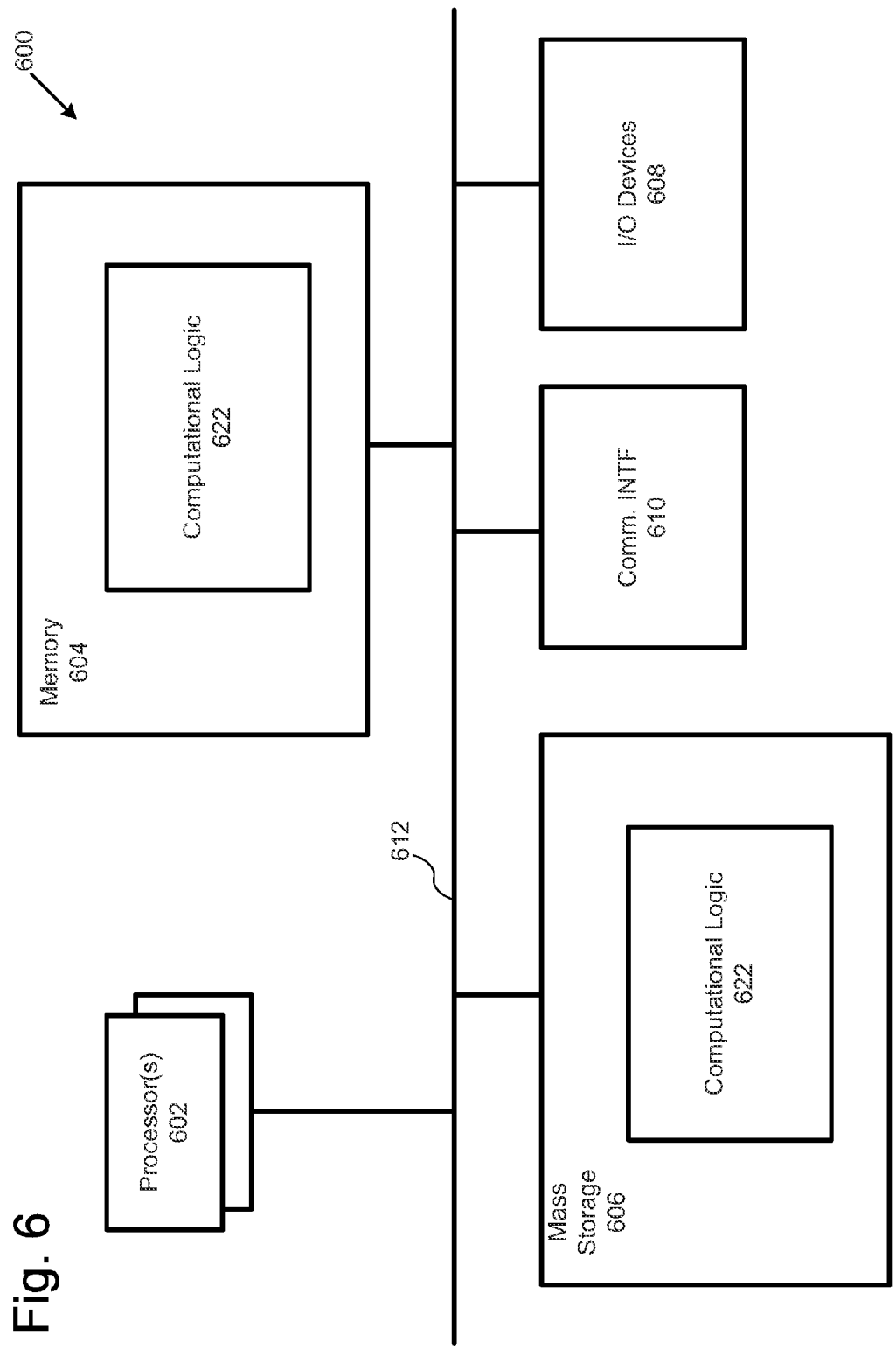
FIG. 6 illustrates an example computing environment suitable for practicing various aspects of the disclosure, in accordance with various embodiments.

Referring now to FIG. 6, an example computer suitable for use for various components of FIGS. 1 and 2 is illustrated in accordance with various embodiments. As shown, computer 600 may include one or more processors or processor cores 602, and system memory 604, which may be volatile or non-volatile memory. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, capacitive touchpads 252/256, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and/or mass storage devices 606 may be employed to store a working copy and a permanent copy of the programming instructions implementing the operations associated with user input device 126, e.g., operations shown in FIG. 500. The various elements may be implemented by assembler instructions supported by processor(s) 602 or high-level languages, such as, for example, C, that can be compiled into such instructions.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content consumption device 108 (e.g., a player 122) or a user input device 126, and/or whether the computer 600 is a stationary device such a desktop computer or set-top box, or a mobile device such as the earlier described remote control, a laptop computer, tablet computer, smart phone, etc. For example, when used for the earlier described remote control, computer 600 may include non-volatile memory, and not mass storage 606. Further, I/O device 608 may include the capacitive touch pads and various knobs and/or buttons as earlier described. Their constitutions are otherwise known, and accordingly will not be further described.

Figure 7:
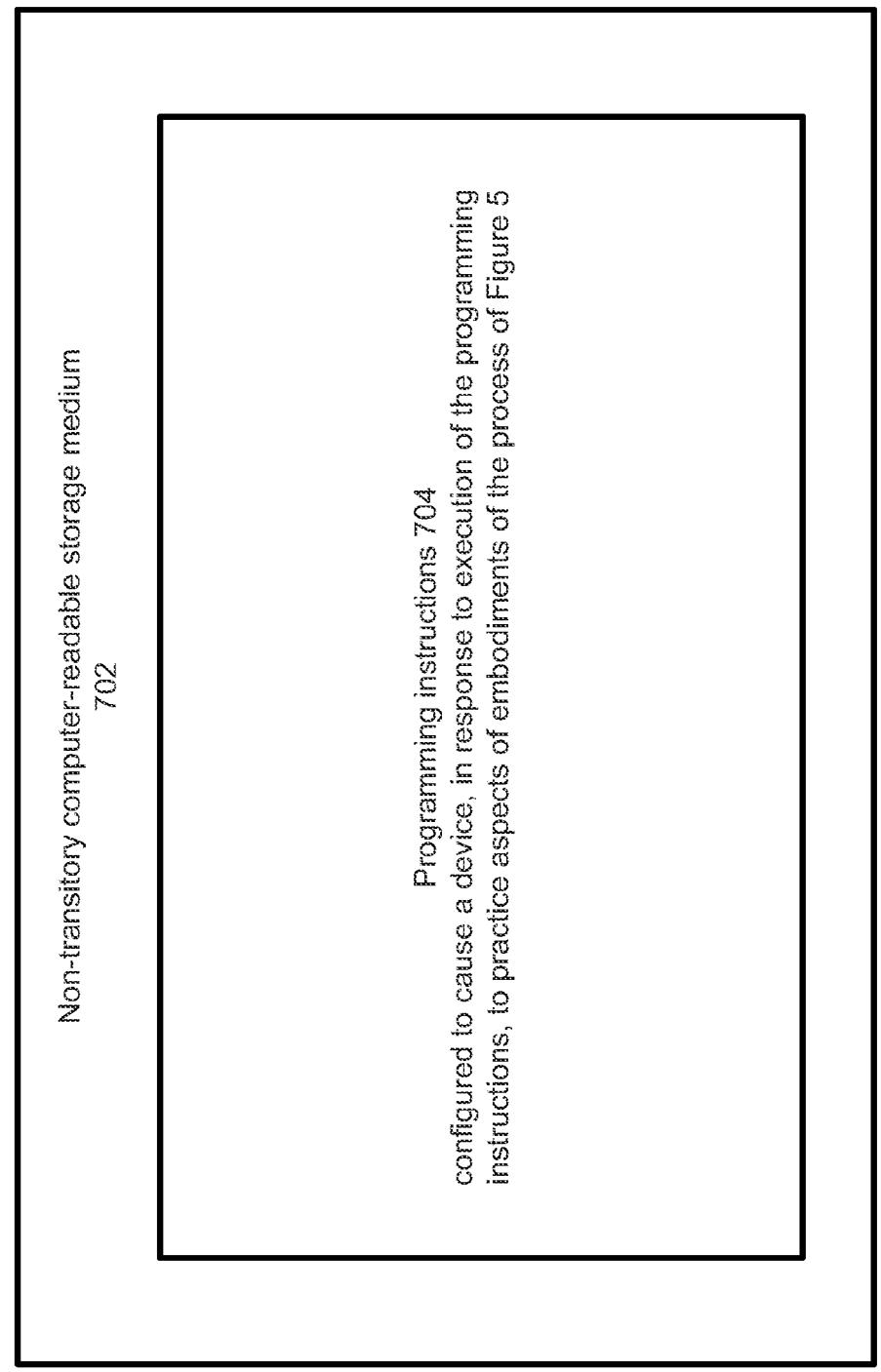
FIG. 7 illustrates an example storage medium with instructions configured to enable an apparatus to practice various aspects of the present disclosure, in accordance with various embodiments.

FIG. 7 illustrates an example non-transitory computer-readable storage medium 702 having instructions configured to practice all or selected ones of the operations associated with content consumption devices 108 and/or user input device 126, earlier described, in accordance with various embodiments. As illustrated, non-transitory computer-readable storage medium 702 may include a number of programming instructions 704. Programming instructions 704 may be configured to enable a device, e.g., computer 600, in response to execution of the programming instructions, to perform, e.g., various operations of process 500 of FIG. 5. In alternate embodiments, programming instructions 704 may be disposed on multiple non-transitory computer-readable storage media 702 instead.

Referring back to FIG. 6, for one embodiment, at least one of processors 602 may be packaged together with computational logic 622 configured to practice aspects of process 500 of FIG. 5. For one embodiment, at least one of processors 602 may be packaged together with computational logic 622 configured to practice aspects of process 500 of FIG. 5 to form a System in Package (SiP). For one embodiment, at least one of processors 602 may be integrated on the same die with computational logic 622 configured to practice aspects of process 500 of FIG. 5. For one embodiment, at least one of processors 602 may be packaged together with computational logic 622 configured to practice aspects of process 500 of FIG. 5 to form a System on Chip (SoC). For at least one embodiment, the SoC may be utilized in, e.g., but not limited to, a mobile computing device such as a computing tablet and/or a smartphone.

Figure 8:
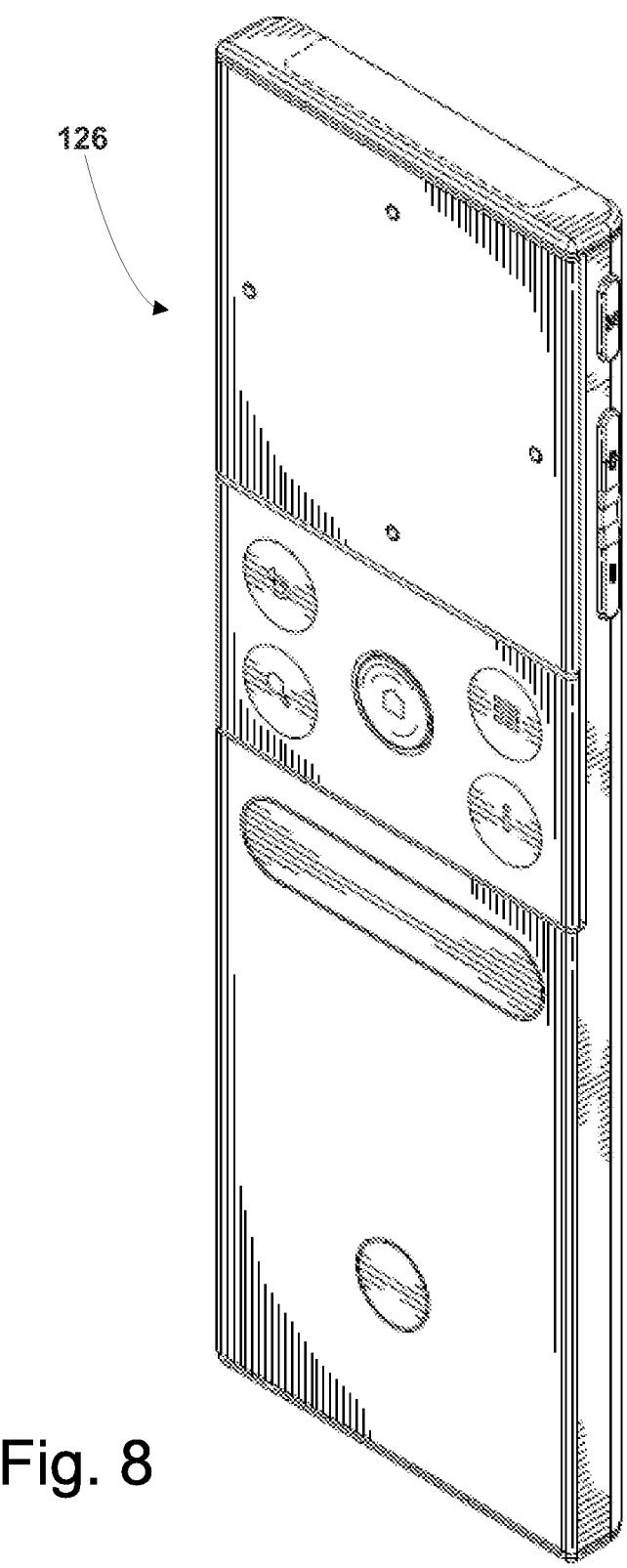
FIG. 8 depicts an example user input device in the form of a remote control, in accordance with various embodiments.

Referring now to FIG. 8, an example user input device 126 in the form of a remote control is depicted. This is merely an example of one possible user input device 126, and other configurations are possible.

Figure 9:
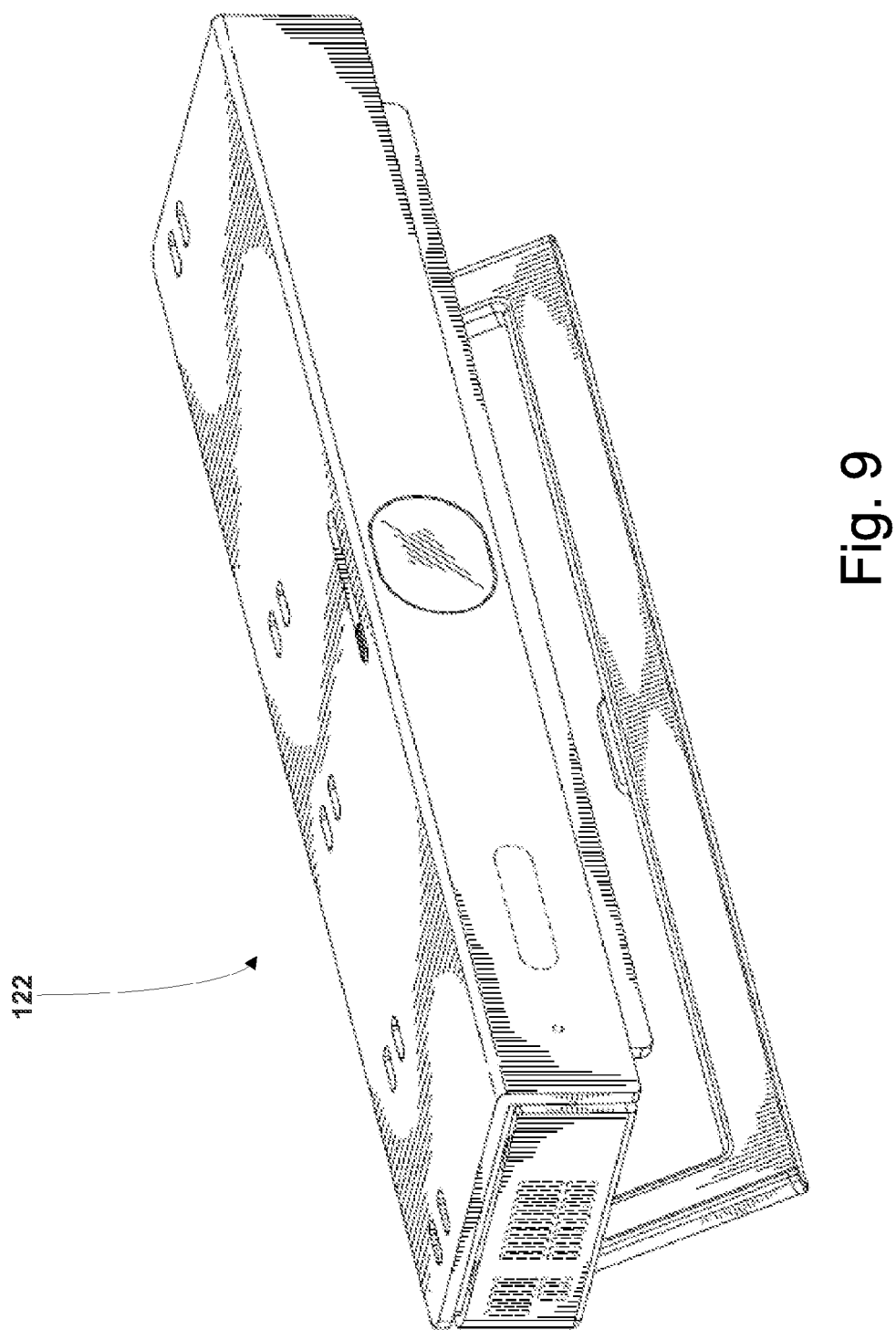
FIGS. 9 and 10 depict front and rear views, respectively, of an example player in the form of a set-top box, in accordance with various embodiments.
Figure 10:
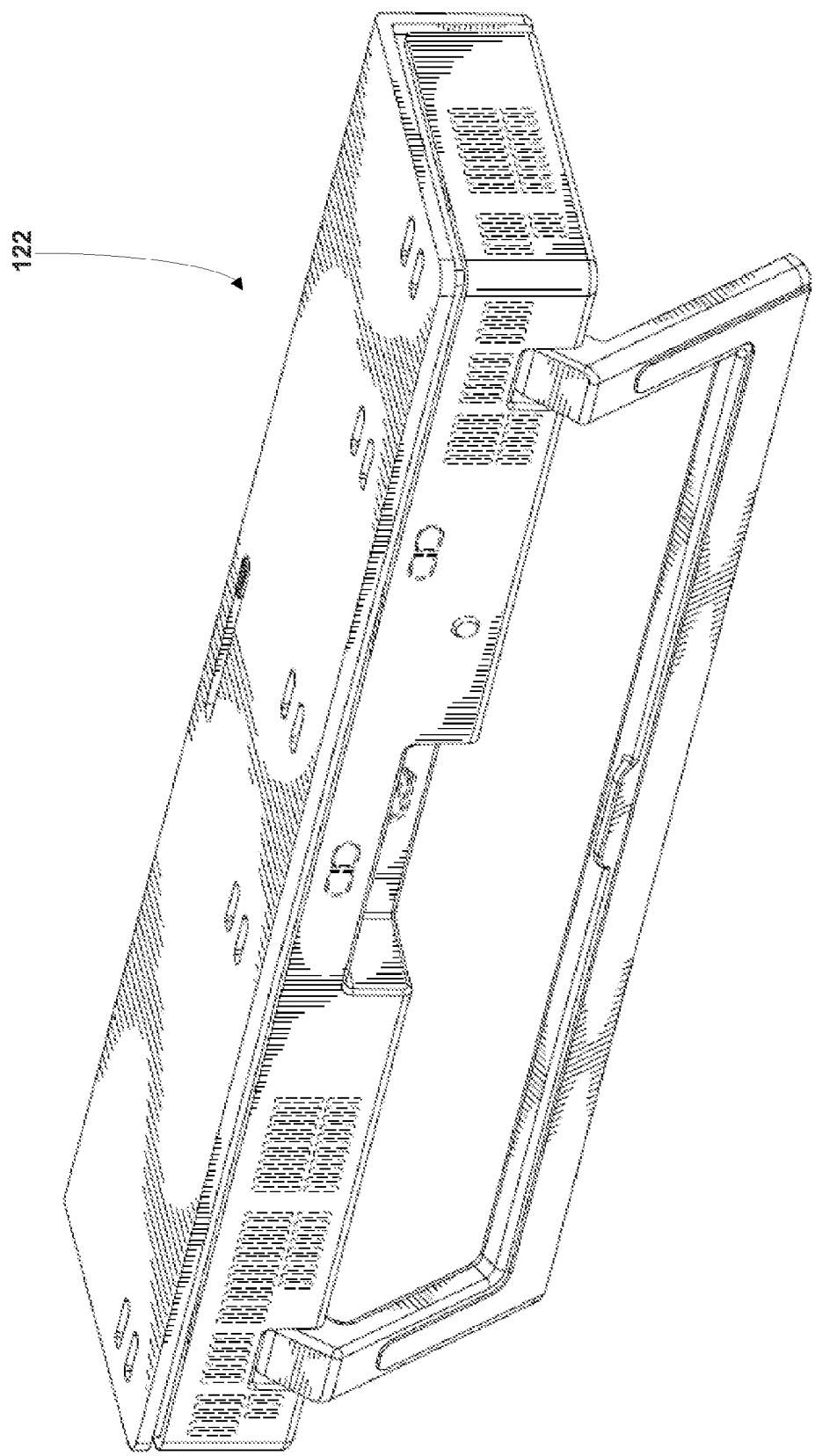

Referring now to FIGS. 9 and 10, an example player 122 in the form of a set-top box is depicted. This is merely an example of one possible player 122, and other configurations are possible.

Computer-readable media (including non-transitory computer-readable media), methods, apparatuses, systems and devices for performing the above-described techniques are illustrative examples of embodiments disclosed herein. Additionally, other devices in the above-described interactions may be configured to perform various disclosed techniques.

EXAMPLES

Example 1 is an apparatus to control a remote computing device, the apparatus comprising: a wireless transmitter, a capacitive touchpad; and logic operably coupled with the wireless transmitter and capacitive touchpad, the logic being configured to: detect a change in position and/or a velocity of a change in position of a tactile input received at the capacitive touchpad: generate, based at least in part on the detected change in position and/or velocity of the change in position, a signal configured to cause the remote computing device to perform an operation associated with provision of a media content for consumption: and transmit the signal with the wireless transmitter directly to a wireless receiver of the remote computing device.

Example 2 includes the apparatus of Example 1, wherein the capacitive touchpad is a first capacitive touchpad to receive tactile input along a single axis, the apparatus further comprising a second capacitive touchpad to receive tactile input along two or more axes.

Example 3 includes the apparatus of Example 1, wherein the signal is configured to cause the remote computing device to advance or retreat through the media content by an amount that corresponds to the detected change in position and/or velocity of the change in position of the received tactile input.

Example 4 includes the apparatus of Example 3, wherein the media content comprises a first piece of media content and a second piece of media content that follows the first piece of media content in a sequence, and the signal is configured to cause the remote computing device to advance or retreat the media content between the first and second pieces of media content based on the detected change in position and/or velocity of the change in position of the received tactile input.

Example 5 includes the apparatus of any one of Examples 1-4, wherein the signal is configured to cause the remote computing device to scroll through an arrangement of selectable elements rendered by the remote computing device in association with the media content by an amount that is based at least in part on the detected change in position and/or velocity of the change in position of the received tactile input.

Example 6 includes the apparatus of any one of Example 1-4, further comprising a display operably coupled to the logic, wherein the logic is further configured to cause the display to render selectable content.

Example 7 includes the apparatus of Example 6, wherein the display and the capacitive touchpad together comprise a touch screen.

Example 8 includes the apparatus of Example 7, wherein the selectable content comprises a progress path, and the logic is further configured to cause the display to render an indicator at a position along the progress path dictated by the received tactile input.

Example 9 includes the apparatus of Example 8, wherein the signal is configured to cause the remote computing device to advance or retreat a media content provided by the remote computing device to a temporal position that corresponds to the position of the indicator along the progress path.

Example 10 includes the apparatus of Example 8, wherein the signal is configured to cause the remote computing device to scroll through an arrangement of selectable elements provided by the remote computing device to a position in the arrangement of selectable elements that corresponds to the position of the of the indicator along the progress path.

Example 11 includes a system comprising: a media content player comprising a wireless receiver and being configured to render a media content on a display; and a remote control comprising a capacitive touchpad and a wireless transmitter, the remote control being configured to: generate, based at least in part on a detected change in position and/or a velocity of a change in position of a tactile input received at the capacitive touchpad, a signal configured to cause the media content player to perform an operation associated with provision of the media content for consumption; and transmit the signal with the wireless transmitter directly to the wireless receiver of the media content player.

Example 12 includes the system of Example 11, wherein the capacitive touchpad is a first capacitive touchpad to receive tactile input along a single axis, the remote control further comprising a second capacitive touchpad to receive tactile input along two or more axes.

Example 13 includes the system of Example 11, wherein the signal is configured to cause the media content player to advance or retreat through the media content by an amount that corresponds to the detected change in position and/or velocity of the change in position of the received tactile input.

Example 14 includes the system of Example 13, wherein the media content comprises a first piece of media content and a second piece of media content that follows the first piece of media content in a sequence, and the signal is configured to cause the media content player to advance or retreat the media content between the first and second pieces of media content based on the detected change in position and/or velocity of the change in position of the received tactile input.

Example 15 includes the system of any one of Examples 11-14, wherein the signal is configured to cause the media content player to scroll through an arrangement of selectable elements rendered by the media content player in association with the media content by an amount that is based at least in part on the detected change in position and/or velocity of the change in position of the received tactile input.

Example 16 includes the system of any one of Examples 11-14, wherein the remote control further comprises a remote control display, wherein the remote control is further configured to cause the remote control display to render selectable content.

Example 17 includes the system of Example 16, wherein the remote control display and the capacitive touchpad together comprise a touch screen.

Example 18 includes the system of Example 17, wherein the selectable content comprises a progress path, and the logic is further configured to cause the remote control display to render an indicator at a position along the progress path dictated by the received tactile input.

Example 19 includes the system of Example 18, wherein the signal is configured to cause the media content player to advance or retreat a media content provided by the media content player to a temporal position that corresponds to the position of the indicator along the progress path.

Example 20 includes the system of Example 18, wherein the signal is configured to cause the media content player to scroll through an arrangement of selectable elements provided by the media content player to a position in the arrangement of selectable elements that corresponds to the position of the of the indicator along the progress path.

Example 21 is directed to a computer-implemented method comprising: detecting, by a computing device, a change in position and/or a velocity of a change in position of a tactile input received at a capacitive touchpad; generating, by the computing device, based at least in part on the detected change in position and/or velocity of the change in position, a signal configured to cause a remote computing device to perform an operation associated with provision of a media content for consumption; and transmitting, by the computing device, the signal with a wireless transmitter directly to a wireless receiver of the remote computing device.

Example 22 includes the computer-implemented method of Example 21, wherein the generating comprising generating, by the computing device, the signal to cause the remote computing device to advance or retreat through the media content by an amount that corresponds to the detected change in position and/or velocity of the change in position of the received tactile input.

Example 23 includes the computer-implemented method of Example 22, wherein the media content comprises a first piece of media content and a second piece of media content that follows the first piece of media content in a sequence, and the generating comprises generating, by the computing device, the signal to cause the remote computing device to advance or retreat the media content between the first and second pieces of media content based on the detected change in position and/or velocity of the change in position of the received tactile input.

Example 24 includes the computer-implemented method of any one of Examples 21-23, wherein the generating comprises generating, by the computing device, the signal to cause the remote computing device to scroll through an arrangement of selectable elements rendered by the remote computing device in association with the media content by an amount that is based at least in part on the detected change in position and/or velocity of the change in position of the received tactile input.

Example 25 includes the computer-implemented method of any one of Examples 21-24, further comprising rendering, by the computing device on a display of the computing device, selectable content.

Example 26 includes the computer-implemented method of Example 25, wherein the selectable content comprises a progress path, and the method further comprises rendering, by the computing device, an indicator at a position along the progress path dictated by the received tactile input.

Example 27 includes the computer-implemented method of Example 26, wherein the generating comprises generating, by the computing device, the signal to cause the remote computing device to advance or retreat a media content provided by the remote computing device to a temporal position that corresponds to the position of the indicator along the progress path.

Example 28 includes the computer-implemented method of Example 26, wherein the generating comprises generating, by the computing device, the signal to cause the remote computing device to scroll through an arrangement of selectable elements provided by the remote computing device to a position in the arrangement of selectable elements that corresponds to the position of the of the indicator along the progress path.

Example 29 is directed to an apparatus comprising: means for detecting a change in position and/or a velocity of a change in position of a tactile input received at a capacitive touchpad; means for generating, based at least in part on the detected change in position and/or velocity of the change in position, a signal configured to cause a remote computing device to perform an operation associated with provision of a media content for consumption; and means for transmitting the signal directly to a wireless receiver of the remote computing device.

Example 30 includes the apparatus of Example 29, wherein the means for generating comprises means for generating the signal to cause the remote computing device to advance or retreat through the media content by an amount that corresponds to the detected change in position and/or velocity of the change in position of the received tactile input.

Example 31 includes the apparatus of Example 30, wherein the media content comprises a first piece of media content and a second piece of media content that follows the first piece of media content in a sequence, and the means for generating comprises means for generating the signal to cause the remote computing device to advance or retreat the media content between the first and second pieces of media content based on the detected change in position and/or velocity of the change in position of the received tactile input.

Example 32 includes apparatus of any one of Examples 29-31, wherein the means for generating comprises means for generating the signal to cause the remote computing device to scroll through an arrangement of selectable elements rendered by the remote computing device in association with the media content by an amount that is based at least in part on the detected change in position and/or velocity of the change in position of the received tactile input.

Example 33 includes the apparatus of any one of Examples 29-31, further comprising means for rendering selectable content on a display of the apparatus.

Example 34 includes the apparatus of Example 33, wherein the selectable content comprises a progress path, and the apparatus further comprises means for rendering an indicator at a position along the progress path dictated by the received tactile input.

Example 35 includes the apparatus of Example 34, wherein the means for generating comprises means for generating the signal to cause the remote computing device to advance or retreat a media content provided by the remote computing device to a temporal position that corresponds to the position of the indicator along the progress path.

Example 36 includes the apparatus of Example 34, wherein the means for generating comprises means for generating the signal to cause the remote computing device to scroll through an arrangement of selectable elements provided by the remote computing device to a position in the arrangement of selectable elements that corresponds to the position of the of the indicator along the progress path.

Example 37 is directed to at least one computer-readable medium comprising instructions that, in response to execution by a computing device, cause the computing device to: detect a change in position and/or a velocity of a change in position of a tactile input received at a capacitive touchpad; generate, based at least in part on the detected change in position and/or velocity of the change in position, a signal configured to cause a remote computing device to perform an operation associated with provision of a media content for consumption; and transmit the signal with a wireless transmitter directly to a wireless receiver of the remote computing device.

Example 38 includes at least one computer-readable medium of Example 37, wherein the instructions are further configured to cause the computing device, in response to execution of the instruction by the computing device, to generate the signal to cause the remote computing device to advance or retreat through the media content by an amount that corresponds to the detected change in position and/or velocity of the change in position of the received tactile input.

Example 39 includes the at least one computer-readable medium of Example 38, wherein the media content comprises a first piece of media content and a second piece of media content that follows the first piece of media content in a sequence, and the generate comprises generate the signal to cause the remote computing device to advance or retreat the media content between the first and second pieces of media content based on the detected change in position and/or velocity of the change in position of the received tactile input.

Example 40 includes the at least one computer-readable medium of any one of Examples 37-39, wherein the instructions are further configured to cause the computing device, in response to execution of the instruction by the computing device, to generate the signal to cause the remote computing device to scroll through an arrangement of selectable elements rendered by the remote computing device in association with the media content by an amount that is based at least in part on the detected change in position and/or velocity of the change in position of the received tactile input.

Example 41 includes the at least one computer-readable medium of any one of Examples 37-39, wherein the instructions are further configured to cause the computing device, in response to execution of the instruction by the computing device, to render on a display of the computing device, selectable content.

Example 42 includes the at least one computer-readable medium of Example 41, wherein the selectable content comprises a progress path, and wherein the instructions are further configured to cause the computing device, in response to execution of the instruction by the computing device, to render an indicator at a position along the progress path dictated by the received tactile input.

Example 43 includes the at least one computer-readable medium of Example 42, wherein the instructions are further configured to cause the computing device, in response to execution of the instruction by the computing device, to generate the signal to cause the remote computing device to advance or retreat a media content provided by the remote computing device to a temporal position that corresponds to the position of the indicator along the progress path.

Example 44 includes the at least one computer-readable medium of Example 42, wherein the instructions are further configured to cause the computing device, in response to execution of the instruction by the computing device, to the signal to cause the remote computing device to scroll through an arrangement of selectable elements provided by the remote computing device to a position in the arrangement of selectable elements that corresponds to the position of the of the indicator along the progress path.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus to control a remote computing device, the apparatus comprising:
   a wireless transmitter;
   a capacitive touchpad; and
   logic operably coupled with the wireless transmitter and capacitive touchpad, the logic being configured to:
      detect a change in position and/or a velocity of a change in position of a tactile input received at the capacitive touchpad;
      generate, based at least in part on the detected change in position and/or velocity of the change in position, a signal configured to cause the remote computing device to perform an operation associated with provision of a media content for consumption; and
      transmit the signal with the wireless transmitter directly to a wireless receiver of the remote computing device;
      wherein the signal is configured to cause the remote computing device to advance or retreat through the media content by an amount that corresponds to the detected change in position and/or velocity of the change in position of the received tactile input.

2. The apparatus of claim 1, wherein the capacitive touchpad is a first capacitive touchpad to receive tactile input along a single axis, the apparatus further comprising a second capacitive touchpad to receive tactile input along two or more axes.

3. The apparatus of claim 1, wherein the media content comprises a first piece of media content and a second piece of media content that follows the first piece of media content in a sequence, and the signal is configured to cause the remote computing device to advance or retreat the media content between the first and second pieces of media content based on the detected change in position and/or velocity of the change in position of the received tactile input.

4. The apparatus of claim 1, wherein the signal is configured to cause the remote computing device to scroll through an arrangement of selectable elements rendered by the remote computing device in association with the media content by an amount that is based at least in part on the detected change in position and/or velocity of the change in position of the received tactile input.

5. The apparatus of claim 1, further comprising a display operably coupled to the logic, wherein the logic is further configured to cause the display to render selectable content.

6. The apparatus of claim 5, wherein the display and the capacitive touchpad together comprise a touch screen.

7. The apparatus of claim 6, wherein the selectable content comprises a progress path, and the logic is further configured to cause the display to render an indicator at a position along the progress path dictated by the received tactile input.

8. The apparatus of claim 7, wherein the signal is configured to cause the remote computing device to advance or retreat a media content provided by the remote computing device to a temporal position that corresponds to the position of the indicator along the progress path.

9. The apparatus of claim 7, wherein the signal is configured to cause the remote computing device to scroll through an arrangement of selectable elements provided by the remote computing device to a position in the arrangement of selectable elements that corresponds to the position of the of the indicator along the progress path.

10. A system comprising:
    a media content player comprising a wireless receiver and configured to render a media content on a display; and
    a remote control comprising a capacitive touchpad and a wireless transmitter, the remote control being configured to:
       generate, based at least in part on a detected change in position and/or a velocity of a change in position of a tactile input received at the capacitive touchpad, a signal configured to cause the media content player to perform an operation associated with provision of the media content for consumption; and
       transmit the signal with the wireless transmitter directly to the wireless receiver of the media content player;
       wherein the signal is configured to cause the media content player to advance or retreat through the media content by an amount that corresponds to the detected change in position and/or velocity of the change in position of the received tactile input.

11. The system of claim 10, wherein the capacitive touchpad is a first capacitive touchpad to receive tactile input along a single axis, the remote control further comprising a second capacitive touchpad to receive tactile input along two or more axes.

12. The system of claim 10, wherein the media content comprises a first piece of media content and a second piece of media content that follows the first piece of media content in a sequence, and the signal is configured to cause the media content player to advance or retreat the media content between the first and second pieces of media content based on the detected change in position and/or velocity of the change in position of the received tactile input.

13. The system of claim 10, wherein the signal is configured to cause the media content player to scroll through an arrangement of selectable elements rendered by the media content player in association with the media content by an amount that is based at least in part on the detected change in position and/or velocity of the change in position of the received tactile input.

14. The system of claim 10, wherein the remote control further comprises a remote control display, wherein the remote control is further configured to cause the remote control display to render selectable content.

15. The system of claim 14, wherein the remote control display and the capacitive touchpad together comprise a touch screen.

16. The system of claim 15, wherein the selectable content comprises a progress path, and the logic is further configured to cause the remote control display to render an indicator at a position along the progress path dictated by the received tactile input.

17. The system of claim 16, wherein the signal is configured to cause the media content player to advance or retreat a media content provided by the media content player to a temporal position that corresponds to the position of the indicator along the progress path.

18. The system of claim 16, wherein the signal is configured to cause the media content player to scroll through an arrangement of selectable elements provided by the media content player to a position in the arrangement of selectable elements that corresponds to the position of the of the indicator along the progress path.

19. A computer-implemented method comprising:
   detecting, by a computing device, a change in position and/or a velocity of a change in position of a tactile input received at a capacitive touchpad;
   generating, by the computing device, based at least in part on the detected change in position and/or velocity of the change in position, a signal configured to cause a remote computing device to perform an operation associated with provision of a media content for consumption; and
   transmitting, by the computing device, the signal with a wireless transmitter directly to a wireless receiver of the remote computing device;
   wherein the generating comprises generating, by the computing device, the signal to cause the remote computing device to advance or retreat through the media content by an amount that corresponds to the detected change in position and/or velocity of the change in position of the received tactile input.

20. The computer-implemented method of claim 19, wherein the media content comprises a first piece of media content and a second piece of media content that follows the first piece of media content in a sequence, and the generating comprises generating, by the computing device, the signal to cause the remote computing device to advance or retreat the media content between the first and second pieces of media content based on the detected change in position and/or velocity of the change in position of the received tactile input.

21. At least one non-transitory computer-readable storage medium comprising instructions that, in response to execution by a computing device, cause the computing device to: detect a change in position and/or a velocity of a change in position of a tactile input received at a capacitive touchpad; generate, based at least in part on the detected change in position and/or velocity of the change in position, a signal configured to cause a remote computing device to perform an operation associated with provision of a media content for consumption, wherein the signal is to cause the remote computing device to advance or retreat through the media content by an amount that corresponds to the detected change in position and/or velocity of the change in position of the received tactile input; and transmit the signal with a wireless transmitter directly to a wireless receiver of the remote computing device.

* * * * *